United States Patent

Laymon et al.

[15] 3,696,369

[45] Oct. 3, 1972

[54] SIGNAL PROCESSOR

[72] Inventors: Marvin D. Laymon, Milpitas, Calif.; Jerome D. McCoy, Tulsa, Okla.; Millard F. Schewe, Sunnyvale, Calif.

[73] Assignee: Sylvania Electric Products Inc.

[22] Filed: Dec. 2, 1970

[21] Appl. No.: 94,405

[52] U.S. Cl. ............................. 340/258 D, 340/261
[51] Int. Cl. ............................................. G08b 13/00
[58] Field of Search ........ 340/261, 258 D, 258 R, 15, 340/15.5 GG, 16, 276

[56] References Cited

UNITED STATES PATENTS

| 3,487,396 | 12/1969 | Perelman | 340/276 X |
| 3,147,467 | 9/1964 | Laakmann | 340/258 D X |
| 2,991,458 | 7/1961 | Cooke et al. | 340/258 D X |

Primary Examiner—John W. Caldwell
Assistant Examiner—Michael Slobasky
Attorney—Norman J. O'Malley, Russell A. Cannon and John F. Lawler

[57] ABSTRACT

Seismic vibrations sensed by a geophone in a protected area are converted to an electrical seismic signal that is applied to an envelope detector. The detected signal is coupled directly and through an integrator which inverts the polarity thereof to a summing network. The zero crossings of the seismic signal are detected to generate a train of pulses that are integrated to produce a signal having an amplitude that is related to the fundamental frequency of the seismic signal and of the opposite polarity with respect to the detected signal and which is applied to the summing network. The output of the summing network is applied to a threshold circuit which produces an alarm indicating intrusion of the protected area when the magnitude of the sum signal exceeds a prescribed threshold level.

26 Claims, 16 Drawing Figures

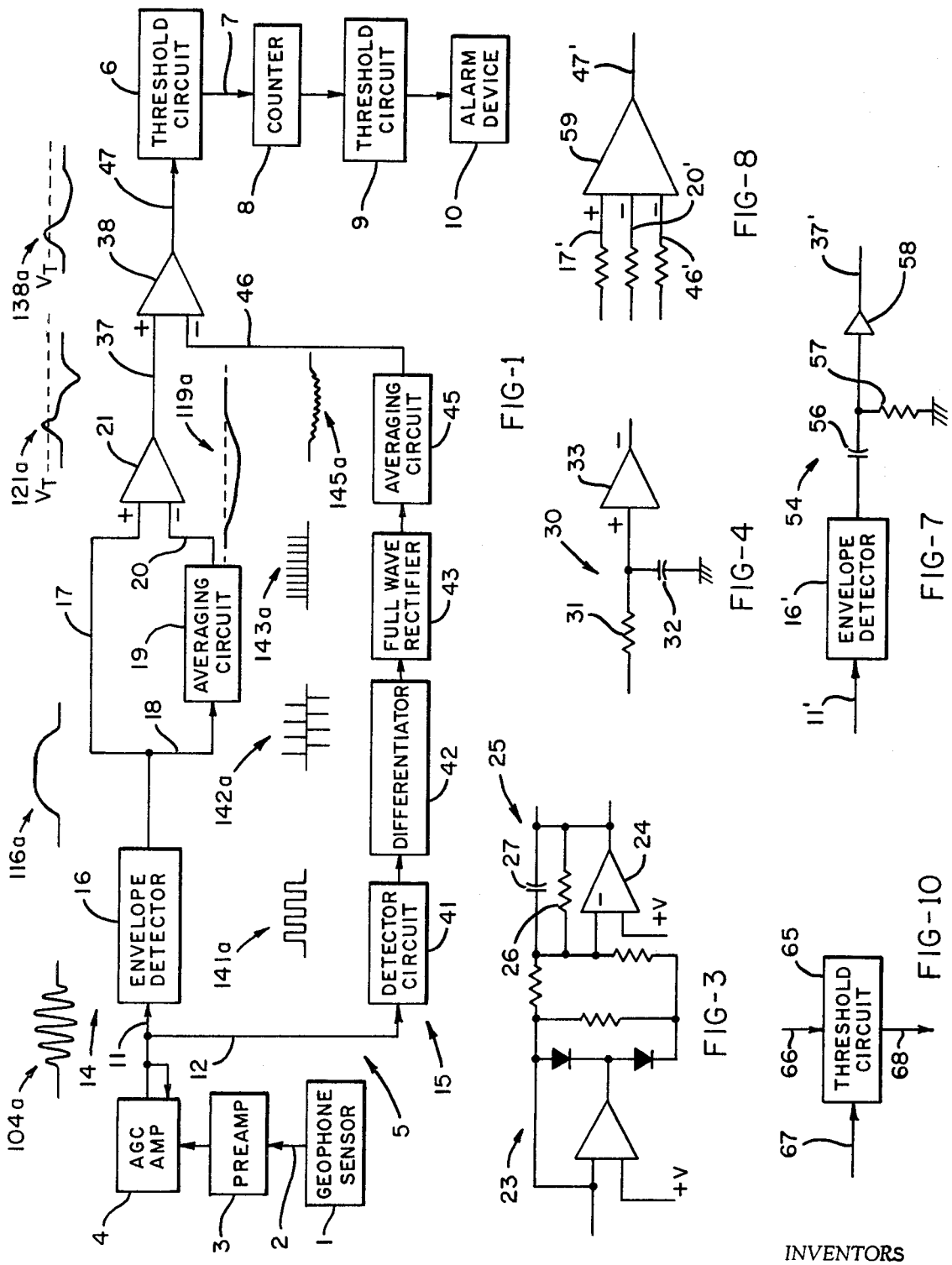

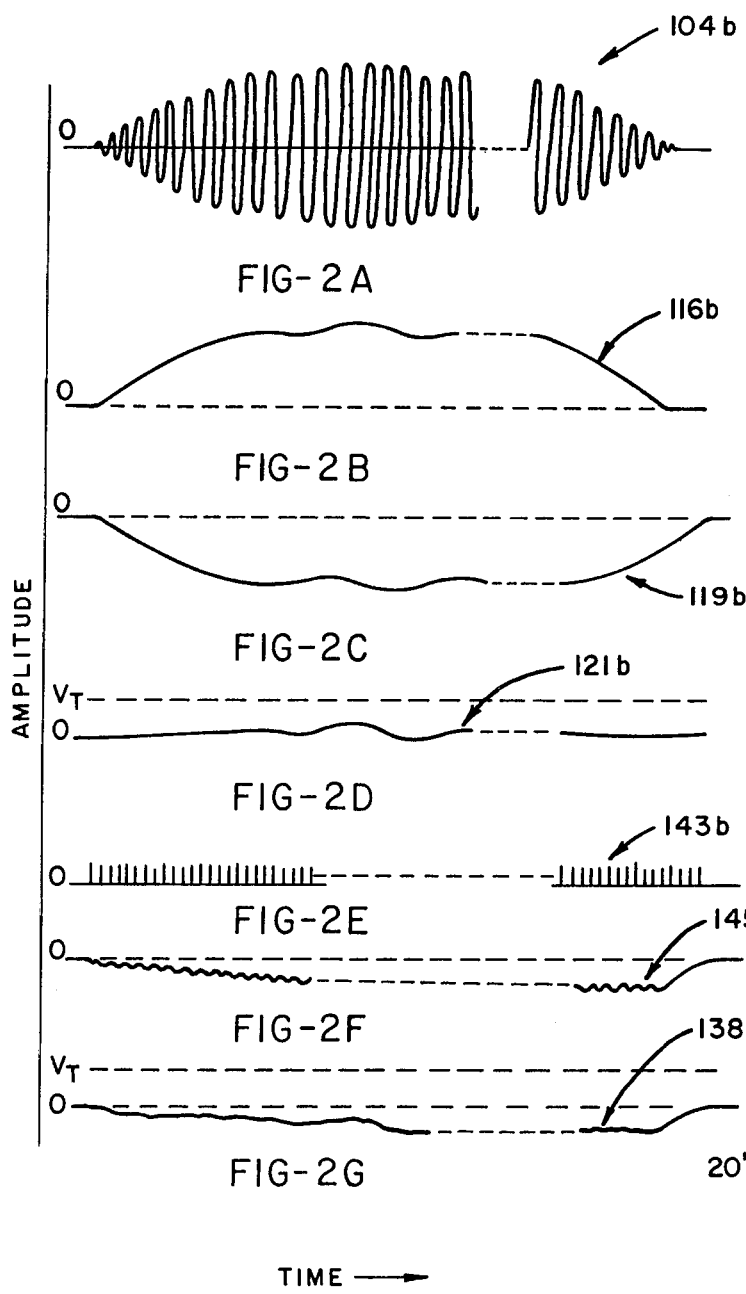
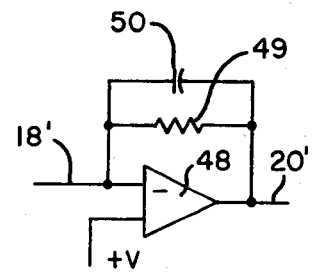
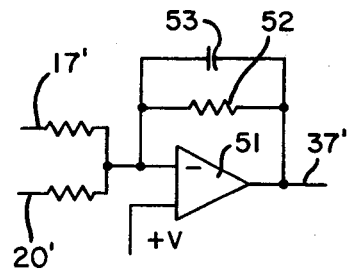
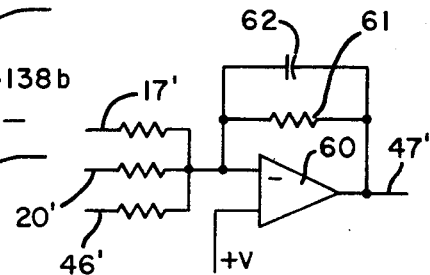

SIGNAL PROCESSOR

BACKGROUND OF INVENTION

This invention relates to seismic intrusion detection systems and more particularly to a signal process or for such systems.

In certain applications it is desirable to be able to automatically detect walking humans and moving motor vehicles such as a car or truck crossing a border located in a remote and uninhabited area. By way of example, it is desirable to know when someone is illegally entering a country by walking or driving across an unmanned border between two countries. It is desirable in such applications to produce an alarm when an intruder walks or drives a vehicle across the border without producing false alarms in response to helicopters and other low flying aircraft, and variations in environmental conditions such as wind and rain. Seismic intrusion detection systems may be employed in such applications. Seismic signals produced by walking men and moving motor vehicles are comprised of low frequency spectral components. In contrast, seismic signals produced by seismic sources such as rain and aircraft may include both low frequency and high frequency spectral components. In a prior art signal processor, the energies in high and low frequency components of a seismic signal are compared for distinguishing seismic signals made by walking humans and operating motor vehicles from other seismic signals such as those made by rain, wind and aircraft. The false alarm rate of this system in response to seismic signals produced by aircraft is higher than is desirable in certain applications.

An object of this invention is the provision of an improved seismic signal processor.

SUMMARY OF INVENTION

It has been determined that a walking intruder and a motor vehicle moving over uneven terrain both produce burst-type seismic signals having envelopes whose instantaneous peak value is much greater than the average value thereof. The frequencies of strong spectral components of these burst seismic signals are usually relatively low (e.g., 10 to 30 Hz). In contrast, rain and aircraft, other than helicopters, produce seismic signals which are much more continuous and have envelopes whose instantaneous peak and average values are nearly equal. The fundamental frequency of these continuous seismic signals is usually high (e.g., greater than 40 Hz). Helicopters, on the other hand, produce seismic signals which have envelopes that are continuous, but have a low fundamental frequency (e.g., 10 to 40 Hz). Although the envelopes of continuous signals are not absolutely flat, they are more smooth than the envelope of a burst signal over a time interval longer than the duration of the latter signal.

In accordance with this invention, burst seismic signals are distinguished from continuous seismic signals by comparing indications of the instantaneous peak envelope amplitude and the average value thereof for a seismic signal. If the indication of the instantaneous peak envelope amplitude exceeds the indication of the average value thereof by a prescribed amount, the seismic signal is determined to be a burst seismic signal. Indications of the fundamental frequency of seismic signals may also be compared with the amplitude indications for distinguishing burst and continuous seismic signals. In one embodiment of this invention, a seismic signal is determined to be a burst seismic signal when the indication of the instantaneous peak envelope amplitude exceeds the sum of the other two indications by a prescribed amount.

BRIEF DESCRIPTION OF DRAWINGS

FIG. 1 is a block diagram of a seismic intrusion detection system embodying this invention;

FIG. 2A–2G are waveforms useful in explaining the operation of the invention;

FIG. 3 is a schematic diagram of tee envelope detector in the system of FIG. 1;

FIG. 4 is a schematic diagram of an averaging circuit in the system of FIG. 1; and FIGS. 5–10, inclusive, are schematic diagrams of circuitry in alternate embodiments of this invention.

DESCRIPTION OF PREFERRED EMBODIMENTS

Burst-type seismic signals produced by a walking intruder are periodic whereas those produced by a moving vehicle occur at a more random rate. More particularly, the rate at which burst signals occur for a moving vehicle is determined by conditions such as irregularities in the road. Burst signals produced by a walking and a running man are substantially the same. A burst signal produced by such sources is characterized by abrupt changes in envelope amplitude (i.e., short rise and fall times), a short duration, an average value of the envelope signal which is much less than the instantaneous peak amplitude thereof when the envelope signal is averaged over a time interval that is long compared to the envelope rise time, and a concentration of relatively low frequency spectral components having frequencies typically of less than 40 Hz: In some instances the frequencies of strong spectral components in these signals may, however, extend above 70 Hz. The rise time of a burst signal envelope is typically shorter than 0.1 second. The duration of a seismic burst signal is normally between 0.15 and 0.3 second. The frequency of a strong or predominant spectral component (here referred to as the fundamental frequency) in such a burst signal is generally between 20 and 40 Hz. The exact values of these parameters may vary somewhat from the nominal values listed here depending on the composition of the earth in which seismic vibrations are sensed.

In contrast, continuous seismic signals are characterized by a gradual increase and decrease in the envelope amplitude thereof (i.e., long rise and fall times), slowly varying changes in envelope amplitude throughout the duration of the signal, a duration that is much longer than that of a seismic burst signal, an instantaneous peak envelope amplitude that is approximately equal to the average value of the envelope signal when this signal is averaged over a time interval that is short compared to the rise time of the envelope, and spectral components that may extend over a broad band of frequencies much greater than a frequency of 40 Hz. The fundamental frequency corresponding to a strong or predominant spectral component of a continuous signal may therefore be much higher than that of a burst signal. A signal comprising strong spectral components concentrated in a narrow band of frequencies having an upper frequency of less than 40 Hz, however, may also be a continuous signal. The rise time of the envelope of a continuous seismic signal is generally longer than 1 second which is more than 10 times that for a burst signal. The duration of a continuous signal is typically several seconds, although such a signal may extend for much longer periods. It will be noted that the duration of this signal is more than an order of magnitude longer than that of a burst signal.

Referring now to FIG. 1, a seismic intrusion detection system embodying this invention comprises the series combination of amplifiers 3 and 4, signal processor circuit 5, a first threshold circuit 6, counter 8, and a second threshold circuit 9 connected between seismic sensor 1 and alarm device 10. The waveforms in FIGS. 1 and 2 that are designated by the letters a and b in the reference characters illustrate the operation of the system of FIG. 1 in response to burst and continuous seismic vibrations, respectively, in the earth. Each of these waveforms is identified by a numerical reference character that is 100 larger than the numerical reference character identifying the associated component that produces an output signal defined by that waveform.

The seismic sensor 1 may, by way of example, be a geophone which is an acoustic transducer that is placed in contact with the earth. A seismic vibration in the earth is detected by the geophone which produces an electrical seismic signal on line 2. This signal is amplified by the preamplifier and amplifier 4 to produce the amplified seismic signal 104. Amplifier 4 includes automatic gain control (AGC) for increasing the dynamic range which preserves the amplitude variation characteristics of the signal. The amplifier 4 is preferably a bandpass circuit for band limiting the system for reducing response to unwanted low frequency signals such as caused by earthquakes and rejecting high frequency noise outside the range of normal intrusion signals. By way of example, the passband of amplifier 4 may have low and high cutoff frequencies of 10 and 100 Hz, respectively.

The processor circuit 5 comprises envelope amplitude variation channel 14, frequency channel 15, and summing amplifier 38. The amplitude channel includes an envelope detector 16, averaging circuit 19 and summing amplifier 21. Detector 16 may, by way of example, comprise a full wave rectifier and a low pass filter (see FIG. 3). The half wave rectifier 23 is connected to operational amplifier 24 to form a full wave rectifier. A high pass filter 25 comprising resistor 26 and capacitor 27 is connected in the feedback loop of operational amplifier 24 to from a low pass filter. The time constant provided by resistor 26 and capacitor 27 is selected to be short enough to follow the envelope of an individual burst signal produced by a single footstep rather than that of a series of such signals. By way of example, the time constant of the envelope detector may be 0.016 second which is less than the period of the fundamental frequency of a burst signal. The high frequency cutoff frequency of this filter is approximately 10 Hz. Circuit 16 detects the seismic signal 104 for producing the envelope signal 116 having an amplitude that is proportional to the instantaneous amplitude of the seismic signal. The detected signal 116 is applied directly on line 17 to the first input to amplifier 21.

Circuit 19 is also responsive to the detected signal 116 for producing an output signal 119 having an amplitude that is proportional to the average value of and is the opposite polarity with respect to the detected signal. As used here, the average value means the value of the detected signal 116 averaged by circuit 19 over a time interval determined by the time constant thereof. Circuit 19 may, by way of example, be a simple single pole integrator or low pass filter 30 comprising a resistor 31 and capacitor 32, and an inverting amplifier 33 (see FIG. 4). The time constant of circuit 19 is selected to effectively delay the detected signal 116 long enough to make the algebraic sum of the signals 116 and 119 on lines 17 and 20, respectively, exceed a prescribed threshold level for burst-type seismic signals (see the waveform 121a) and at the same time short enough to make the algebraic sum of these signals less than the prescribe threshold level for continuous seismic signals (see the waveform 121b, FIG. 2D). Stated differently, the time constant is selected to be long compared to the rise time of the envelope of an individual burst signal produced by a single footstep and at the same time to be short compared to the rise time of the envelope of a continuous signal. By way of example, the time constant of circuit 19 may be 0.3 second which is approximately equal to the duration of a burst signal. The high frequency cutoff frequency of this filter is approximately 0.5 Hz. Thus, the detected signals 116a and 116b associated with burst and continuous seismic signals, respectively, are both continuously averaged over time intervals of the same duration T. Amplifier 21 combines the detected signal 116 and average signal 119 on lines 17 and 20, respectively, for producing the sum signal 121 which is applied on line 37 to amplifier 38.

The frequency channel 15 comprises the series combination of a detector circuit 41, differentiator 42, rectifier 43 and averaging circuit 45 connected in series between the output of amplifier 4 and the second input of amplifier 38. This channel is employed to produce on line 46 the signal 145 having an amplitude that is an indication of the fundamental frequency of the amplified signal 104 on line 12. Circuit 41 may, by way of example, comprise a zero crossing detector which changes operating states each time the amplitude of the seismic signal 104 crosses the zero amplitude reference level. Although the seismic signal 104 is shown as having a single frequency for convenience, burst and continuous seismic signals are actually comprised of a plurality of different spectral components which can make the zero crossings occur irregularly. It appears, however, that circuit 41 detects the frequency of a strong spectral component which tends to predominate and here is referred to as the fundamental frequency. The output of detector 41 is the binary signal 141 which changes levels at a rate equal to the fundamental frequency. The pulse repetition frequency (PRF) of the pulses in the differentiated and rectified signals 142 and 143, respectively, are related to the fundamental frequency of the seismic signal 104.

Averaging circuit 45 may, by way of example, also comprise a low pass filter or integrating circuit such as is illustrated in FIG. 4. Charge is impressed on the capacitor 32 in response to each pulse in the rectified signal 143 at a rate determined by the time constant of this circuit. The charge on capacitor 32 decays between pulses of the signal 143 at the same rate. In this manner, the fundamental frequency of the seismic signal 104 is continuously averaged over a time period having a duration that is equal to the time constant of circuit 45. The amplitude of the output signal on line 46 is an indication of the fundamental frequency of the seismic signal. This time constant of circuit 45 is selected to provide an integration time such that the resultant amplitude of the signal 145 is low for a short duration or burst signal even if the fundamental frequency thereof is high, whereas the amplitude of this signal 145 is relatively high for long duration or continuous signals having the same frequency. Stated differently, the time constant is selected to minimize the response of the frequency channel 15 to burst signals. By way of example, the time constant of circuit 45 may be 0.5 second which is longer than the duration of a burst signal produced by a footstep but is shorter than the duration of a continuous signal. When noise is continuously present, the output of the frequency channel may be fairly large. When a seismic signal and noise are simultaneously present, however, the fundamental frequency of the seismic signal predominates and the output of the frequency channel is adjusted accordingly.

Threshold circuits 6 and 9 may, by way of example, be Schmitt trigger circuits which change operating states when the input signals applied thereto exceed a prescribed threshold level. Counter 8 may, by way of example, be a leaky integrator which increments the charge thereon each time threshold circuit 6 changes operating states. The time constant of the integrator-counter is set so that a prescribed number of threshold crossings such as 3 must be detected by circuit 6 and counted within a prescribed time interval such as 4 seconds before the count in circuit 8 exceeds the threshold level of detector 9. Alarm device 10 may, by way of example, be a lamp or bell.

The operation of the system will now be described in relation to the waveforms in FIG. 1 which represent signals produced by associated components of the system in response to a walking intruder producing burst-type seismic vibrations in the earth. These vibrations occur periodically and are comprised of strong spectral components concentrated in low frequencies of less than 40 Hz. Geophone 1 detects the vibrations and produces an electrical seismic signal on line 2 that is amplified by circuits 3 and 4. The amplified seismic signal 104a is detected by circuit 16 to produce the envelope signal 116a having an amplitude that is proportional to the instantaneous amplitude thereof. The detected signal 116a is integrated by circuit 19 to produce the signal 119a having an amplitude that is proportional to the time varying average value of the detected signal. Comparison of the waveforms 116a and 119a reveals that the magnitude of the detected signal 116a is greater than that of the average value signal 119a at any time $t$ for this burst seismic signal 104a. The signals 116a and 119a are combined in amplifier 21 to produce the envelope amplitude variation signal 121a. The amplitude of the latter signal is proportional to the difference between the time varying values of the instantaneous amplitude of and the average value of the detected signal 116a. The amplitude of this difference signal 121a exceeds the threshold level $V_T$ of circuit 6. Reference to the variation signal 121a reveals that the operation of this circuit accentuates abrupt changes in the amplified seismic signal 104a.

The zero crossings of the seismic signal 104a are detected by circuit 41 to generate the train 141a of sharply defined square-wave pulses which are differentiated to produce the train 142a of impulses or spikes defining each transition of the square-wave pulses. The differentiated signal is rectified to cause all of the impulses in this signal to be of the same polarity, the PRF of the rectified signal 143a being a measure of the fundamental frequency of the seismic signal 104a. Averaging circuit 45 integrates the pulses of the rectified signal for producing the signal 145a having an amplitude that is a measure of the fundamental frequency of the seismic signal 104a. Since the duration of this seismic signal is short and the fundamental frequency thereof low, the amplitude of the signal 145a is also low. The signals 121a and 145a are combined in amplifier 38 to produce the signals 138a on line 47 having an amplitude that is proportional to the difference between the indications of the envelope amplitude variation of and the fundamental frequency of the seismic signal 104a. The amplitude of the signal 138a exceeds the threshold level $V_T$ of circuit 6 since the amplitude of the variation signal 121a is already greater than this level and the amplitude of the signal 145a at this time is low.

Each time the output of the processor circuit on line 47 exceeds the prescribed threshold level $V_T$ of circuit 6, the output of the latter causes the contents of counter 8 to be advanced. If the operation of circuit 6 does not indicate that the signal on line 47 has exceeded this threshold level 3 times within 4 seconds, for example, the charge or count in circuit 8 leaks off to a quiescent level. If the signal on line 47 does exceed the threshold level $V_T$ the prescribed number of times in the predetermined time interval, however, the output of counter 8 exceeds the threshold level of circuit 9. This causes detector 9 to also change operating states to energize alarm device 10 and thus to indicate intrusion of the protected area by a walking intruder or motor vehicle.

The operation of the system of FIG. 1 will now be considered in relation to the signal waveforms 2A–2G which represent the output signals produced by associated components in response to a continuous vibration in the earth. As stated previously, the waveforms in FIGS. 2A–2G are also designated by reference characters 100 larger than the reference characters of components producing them.

A helicopter flying over a seismic sensor produces vibrations in the earth that are continuous and which also comprise strong spectral components having low frequencies. These vibrations are detected by the geophone and amplified to produce the seismic signal 104b, see FIG. 2A. The amplitude of the envelope of this signal builds up and decays gradually and is relatively constant over the duration thereof. This signal is detected by circuit 16 to produce the envelope signal 116b (see FIG. 2B) which is integrated by circuit 19 to produce the average signal 119b (see FIG. 2C). The average signal 119b is essentially a delayed and inverted version of the detected signal 116b, the amplitude of these signals being very nearly equal. These signals 116b and 119b therefore tend to cancel when they are combined to produce the envelope amplitude variation signal 121b (see FIG. 2D) for continuous seismic signals. The amplitude of the signal 121b is therefore much less than the threshold level $V_T$ of circuit 6. An alarm indicating intrusion of the protected area containing the geophone is therefore inhibited. Thus it is seen that the amplitude channel 14 satisfactorily discriminates against seismic signals such as are produced by helicopters. If the peak amplitude of the variation signal 121b is near the threshold level of detector 6 for a continuous seismic signal, the frequency cannel 15 provides additional discrimination to prevent energizing the alarm device.

Channel 15 operates on the seismic signal to generate the train 143b (see FIG. 2E) of pulses that are integrated by circuit 45 to produce the signal 145b (see FIG. 2F) having an amplitude that is a measure of the fundamental frequency of the seismic signal. Since the duration of the input signal is longer than that of a burst signal, the amplitude of the signal 145b is greater than that of the signal 145a even though the fundamental frequencies of these signals may be approximately equal. The signals 121b and 145b are combined in amplifier 38 to produce the resultant signal 138b (see FIG. 2G). Since the seismic signal of a helicopter has a strong low frequency spectral component, the amplitude of the signal 145b is low. Thus, the frequency channel does little in this case, to aid in discriminating against such seismic signals. The operation of the amplitude channel 14, however, that ensures tat an alarm is inhibited. If the seismic signal were produced by rain and comprised strong high frequency components, however, the amplitude of the associated signal 145 would be high so as to reduce the value of the resultant signal 138 to ensure that the amplitude thereof is less than the threshold level of circuit 6. Stated differently, the signal 145 effectively increases the threshold level of detector 6 by an amount that is proportional to the fundamental frequency of the seismic signal such that the amplitude of the variation signal 121 is less than the adjusted threshold level of the detector for a continuous seismic signal. This is true even though the envelope of the seismic signal produced by the rain (or other high frequency continuous signal) is such that it has substantial random amplitude variation throughout the duration thereof.

In a modified form of this invention, the detector circuit 41 of the frequency channel may be a threshold detector which changes operating states each time the amplitude of the seismic signal crosses a prescribed threshold level which is greater than zero and is less than the threshold level of circuit 6. The pulses in the associated signals 141-143 then occur more frequently and irregularly than is illustrated in FIGS. 1 and 2. These irregularities are filtered out in the averaging circuit 45. The operation of a threshold circuit 41 therefore causes the frequency channel 15 to accentuate or produce a higher output voltage for seismic signals having high frequency components than when a zero crossing detector 41 is employed. This circuit also reduces or eliminates response to steady state seismic noise or noise generated in the electrical circuits.

Alternate embodiments of the system in FIG. 1 will now be described in relation to the illustrations in FIGS. 5–10. Similar elements in FIGS. 1 and 5–10 are designated by primed reference characters in the latter FIGS. 5–10.

A modified form of the averaging circuits 19 and 45 is illustrated in FIG. 5 wherein the integrator 30 and amplifier 33 are replaced by an operational amplifier 48 having a high pass filter comprising resistor 49 and capacitor 50 connected between the output and an input thereof to form a low pass filter. The embodiments of the averaging circuits in FIGS. 4 and 5 perform the same functions.

In an alternate embodiment of this invention, an operational amplifier 51 and high pass filter comprising resistor 52 and capacitor 53 (see FIG. 6) may also be substituted for the amplifier 21. In this system the signals on lines 17' and 20' are connected through summing resistors to the same terminal of amplifier 51. The operation of the circuit in FIG. 6 is similar to that of circuit 19 for integrating or averaging the applied signals 116 and 119. The time constant of the circuit in FIG. 6 is selected to be longer than that of the envelope detector 16 to provide additional discrimination against signal envelopes with a very fast rise tine, i.e., to reject a burst signal such as is produced when an object is dropped onto the ground and which has an envelope rise time less than that of a footstep. By way of example, this time constant may be 0.05 second which is approximately equal to the period of the fundamental frequency of a burst signal produced by a walking man.

A modified form of the amplitude variation channel 14 is illustrated in FIG. 7 wherein line 17, averaging circuit 19 and summing amplifier 21 are replaced by a differentiator circuit 54. The differentiator may comprise a capacitor 56, resistor 57, and amplifier 58. It has been determined empirically that this reactive network 54 essentially performs the function of both circuits 19 and 21 for producing a similar output signal 121 on line 37'. The time constant of differentiator circuit 54 may be the same as that of the averaging circuit 19.

In alternate embodiments of this invention the summing amplifiers 21 and 38 are replaced by a single summing amplifier 59 (see FIG. 8) and by an operational amplifier 60 and high pass filter comprising resistor 61 and capacitor 62 (see FIG. 9), respectively. The detected signal 116, average signal 119 and average frequency signal 145 on associated lines 17', 20' and 46', are coupled through summing resistors to separate inputs of amplifier 59 (see FIG. 8) whereas they are all applied through summing resistors to the same input to amplifier 60 (see FIG. 9). The output of the amplifiers on lines 47' are applied to the input of threshold detector 6.

In another embodiment of this invention, circuit 6 is replaced by a threshold detector 65 having a variable threshold level (see FIG. 10). The output of amplitude channel 14 on line 37' is coupled on line 66 directly to a first input of detector 65. The output of frequency channel 15 on line 46 is coupled on line 67 to the second input of detector 65 to automatically change the threshold level thereof as a function of the fundamental frequency of a seismic signal 104. A fixed DC offset voltage in either the amplitude or frequency channel may provide the initial fixed threshold level of circuit 65. The output of detector 65 on line 68 is coupled through line 7 to the counter. In a seismic processor employing only the amplitude channel 14, the threshold circuit 65 may be substituted for amplifier 21 wherein the signals on lines 17 and 20 are coupled through lines 66 and 67, respectively, to circuit 65. In this case the output of detector 65 is also connected through lines 68 and 7 to the counter.

WHAT IS CLAIMED IS:

1. A seismic signal processor for discriminating between burst seismic signals such as are produced by a walking man and continuous seismic signals such as are produced by aircraft, comprising first means responsive to a seismic signal for producing a first signal having an amplitude that is an indication of the difference between the instantaneous amplitude of and the time varying average value of the envelope of said seismic signal, said average value being that value that is related to a time interval that is longer than the rise time of the value of a burst seismic signal and shorter than the rise time of the envelope of a continuous seismic signal, second means responsive to the first signal for producing a second signal indicating that said seismic signal is a burst seismic signal when the value of the amplitude of the first signal is greater than the prescribed value, and third means responsive to the seismic signal for producing a third signal having an amplitude that is proportional to and an indication of the fundamental frequency of said seismic signal, said second producing means including means for comparing said first and third signals, said second producing means generating the second signal indicating that said seismic signal is a burst seismic signal when the operation of said comparing means indicates that the amplitude of the first signal exceeds the amplitude of the third signal by a prescribed amount.

2. The processor according to claim 1 wherein said third producing means comprises fourth means responsive to said seismic signal for producing pulses indicating crossings of a prescribed level by the amplitude of the seismic signal, and means for integrating said pulses over a time interval that is shorter than the duration of a continuous signal for producing said third signal.

3. The processor according to claim 2 wherein said first producing means comprises a second envelope detector responsive to the seismic signal for producing an output signal having an amplitude that is proportional to the instantaneous amplitude thereof, said second envelope detector having a time constant controlling the operation thereof that is shorter than the rise time of the envelope of a burst signal, and a third reactive network responsive to the output signal of said second envelope detector, said third reactive network having a time constant that is long compared to the rise time of the envelope of a burst signal and short compared to the rise time of the envelope of a continuous signal.

4. The processor according to claim 3 wherein said third reactive network has a low pass frequency response and produces the first signal.

5. The processor according to claim 3 wherein said third reactive network averages the output of said second envelope detector over the specified time interval, said first producing means including a second difference circuit responsive to the outputs of said second envelope detector and said third reactive network for producing the first signal.

6. The processor according to claim 2 wherein said fourth producing means comprises a zero crossing detector, pulses from said fourth producing means indicating zero crossings of the amplitude of the seismic signal.

7. The processor according to claim 2 wherein said fourth producing means comprises a first threshold circuit detecting crossings of a threshold level by the seismic signal, said threshold level being greater than the zero reference-level of the seismic signal and less than the prescribed amount specifying the operation of said comparing means.

8. The processor according to claim 2 wherein said third producing means comprises a second differentiator circuit and a first full wave rectifier.

9. The processor according to claim 1 wherein said comparing means comprises a third difference circuit producing an output signal having an amplitude proportional to the difference between the amplitudes of the first and third signals, said second producing means including a second threshold circuit responsive to the output signal of said third difference circuit.

10. The processor according to claim 1 wherein said comparing means comprises a third threshold circuit having a variable threshold level, said third threshold circuit being responsive to the output of said third producing means for varying the threshold level of said third threshold circuit an amount related to the fundamental frequency of said seismic signal and operatively receiving the first signal for producing the second signal indicating that the seismic signal is a burst seismic signal when the amplitude of the first signal exceeds the variable threshold level.

11. The processor according to claim 5 wherein said integrating means integrates pulses over a time interval that is longer than that over which said third reactive network averages the seismic signal.

12. The processor according to claim 3 wherein said second envelope detector comprises a second full wave rectifier and a low pass filter.

13. A seismic signal processor for discriminating between burst and continuous seismic signals comprising an envelope detector responsive to a seismic signal for producing a first signal having an amplitude that is a measure of the instantaneous amplitude of the envelope of the seismic signal, said envelope detector having a time constant controlling the operation thereof that is shorter than the rise time of the envelope of a burst signal, a reactive network receiving the first signal for producing a second signal having an amplitude that is a measure of the difference between the instantaneous amplitude of and the average value of the envelope of the seismic signal, said reactive network having a low pass frequency response and a time constant controlling the operation thereof that is long compared to the rise time of the envelope of a burst signal and short compared to the rise time of the envelope of a continuous signal, means responsive to the seismic signal for producing a third signal having an amplitude that is a measure of the fundamental frequency of said seismic signal, said producing means comprising a first threshold circuit producing pulses indicating crossings of a prescribed level by the amplitude of the seismic signal, and an integrator circuit responsive to the operation of said first threshold circuit for integrating pulses over a time interval that is shorter than the duration of a continuous signal for producing said third signal, and means comparing said second and third signals for producing an indication that said seismic signal is a burst seismic signal when the amplitude of the second signal exceeds the amplitude of the third signal by a prescribed amount.

14. The processor according to claim 13 wherein the time constant of said envelope detector is less than the period of a burst signal fundamental frequency of 30 Hz and the time constant of said reactive network is approximately equal to the duration of a burst signal.

15. The processor according to claim 14 wherein said reactive network comprises a first differentiator circuit having a time constant that is approximately 0.3 second, said integrator circuit having a time constant which is greater than that of said first differentiator circuit.

16. The processor according to claim 15 wherein said producing means comprises a second differentiator circuit and a full-wave rectifier.

17. The processor according to claim 15 wherein said comparing means comprises a difference circuit.

18. The processor according to claim 15 wherein said comparing means comprises a second threshold circuit having a variable threshold level, said second threshold circuit having a first input receiving the third signal for varying the threshold level thereof and having a second input receiving the second signal, said second threshold circuit producing an output signal indicating that the seismic signal is a burst seismic signal when the second signal exceeds the variable threshold level of a prescribed amount.

19. The method of detecting burst seismic signals comprising the steps of producing an indication of the difference between the instantaneous amplitude of and the average value of the envelope of seismic signals, producing an indication of the fundamental frequency of said seismic signal, comparing the difference and frequency indications, and indicating that the seismic signal is a burst seismic signal when the difference indication exceeds the frequency indication by a prescribed amount.

20. The method according to claim 19 wherein said step of producing the difference indication includes the steps of producing separate indications of the instantaneous amplitude of and and average value of the envelope of the seismic signal.

21. The method of detecting burst seismic signals comprising the steps of producing a first indication of the instantaneous amplitude of the envelope of a seismic signal, producing a second indication of the average value of the envelope of a seismic signal, producing a third indication that is a measure of the fundamental frequency of the seismic signal, comparing said first, second and third indications, and indicating that the seismic signal is a burst seismic signal when the difference between the instantaneous amplitude of the envelope of the seismic signal and the sum of the average value of the envelope of and the measure of the fundamental frequency of the seismic signal is a prescribed value.

22. In a seismic intrusion detection system including a seismic sensor for sensing vibrations in a medium for producing associated electrical seismic signals, a seismic signal processor for discriminating between burst seismic signals such as are produced by a walking man and continuous seismic signals such as are produced by low flying aircraft, comprising first means receiving a seismic signal for producing a first signal having an amplitude that is an indication of the instantaneous amplitude of the envelope of the seismic signal, second means receiving the first signal for producing a second signal having an amplitude that is an indication of the difference between the instantaneous amplitude of and the average value of the envelope of the seismic signal, third means receiving the seismic signal for producing a third signal having an amplitude that is an indication of the fundamental frequency of the seismic signal, and means for comparing the second and third signals for producing an indication that said seismic signal is a burst seismic signal when the difference between the instantaneous amplitude of and the average value of the envelope of the seismic signal exceeds the indication of the fundamental frequency of the seismic signal by a prescribed amount.

23. The processor according to claim 22 wherein said third producing means comprises a first threshold circuit producing pulses indicating crossings of a prescribed threshold level by the amplitude of the seismic signal, and an integrator circuit responsive to the operation of said first threshold circuit for integrating pulses for producing the third signal.

24. The processor according to claim 23 wherein said first producing means comprises a first envelope detector and said second producing means comprises a first reactive network having a low pass frequency response, said first reactive network receiving the first signal for producing the second signal, the threshold level of said first threshold circuit being greater than a zero-reference level of the seismic signal.

25. The processor according to claim 24 wherein said comparing means comprises a second threshold circuit having a variable threshold level, said second threshold circuit being responsive to the third signal from said integrator circuit for varying the threshold level of said second threshold circuit an amount that is a measure of the fundamental frequency of the seismic signal and responsive to the second signal for producing an indication that the seismic signal is a burst signal when the amplitude of the second signal exceeds the variable threshold level.

26. The processor according to claim 23 wherein said first producing means comprises a second envelope detector producing the first signal, and said second producing means comprises a second reactive network for averaging the first signal and producing a fourth signal that is a measure of the average value of the envelope of the seismic signal, said comparing means being responsive to the first, third and fourth signals.

* * * * *